US007626288B2

(12) United States Patent
Protze

(10) Patent No.: US 7,626,288 B2
(45) Date of Patent: Dec. 1, 2009

(54) ELECTROMAGNETIC LINEAR DRIVE

(75) Inventor: Carsten Protze, Dresden (DE)

(73) Assignee: Siemens Aktiengesellschaft, Munich (DE)

( * ) Notice: Subject to any disclaimer, the term of this patent is extended or adjusted under 35 U.S.C. 154(b) by 498 days.

(21) Appl. No.: 10/585,746

(22) PCT Filed: Jan. 7, 2005

(86) PCT No.: PCT/DE2005/000033

§ 371 (c)(1),
(2), (4) Date: Jul. 12, 2006

(87) PCT Pub. No.: WO2005/066982

PCT Pub. Date: Jul. 21, 2005

(65) Prior Publication Data

US 2008/0136266 A1 Jun. 12, 2008

(51) Int. Cl.
*H02K 41/00* (2006.01)

(52) U.S. Cl. .......................................... 310/12; 335/279

(58) Field of Classification Search .................. 310/12, 310/13, 14; 335/279
See application file for complete search history.

(56) References Cited

U.S. PATENT DOCUMENTS

| | | | | | |
|---|---|---|---|---|---|
| 506,282 | A * | 10/1893 | Timmis | ...................... | 335/261 |
| 750,132 | A * | 1/1904 | Timmis | ...................... | 335/261 |
| 2,407,963 | A * | 9/1946 | Persons | ...................... | 335/261 |
| 2,584,707 | A * | 2/1952 | Jarvis et al. | ................. | 335/274 |
| 4,491,816 | A * | 1/1985 | Blum | ......................... | 335/245 |
| 4,577,174 | A * | 3/1986 | Lemmer | ..................... | 335/261 |
| 4,633,209 | A * | 12/1986 | Belbel et al. | ................ | 335/261 |
| 4,638,279 | A | 1/1987 | Brisson et al. | | |
| 4,845,451 | A * | 7/1989 | Uetsuhara et al. | ........... | 335/257 |
| 5,066,980 | A * | 11/1991 | Schweizer | .................. | 335/255 |
| 6,020,567 | A | 2/2000 | Ishikawa | | |
| 2003/0189474 | A1 | 10/2003 | Lang et al. | | |

FOREIGN PATENT DOCUMENTS

| | | | |
|---|---|---|---|
| DE | 35 05 724 | A1 | 8/1985 |
| DE | 195 09 195 | A1 | 9/1996 |
| EP | 0 867 903 | A2 | 9/1998 |
| GB | 2 077 045 | A | 12/1981 |
| SE | 7 502 136 | L | 8/1976 |

* cited by examiner

*Primary Examiner*—Quyen Leung
*Assistant Examiner*—Alex W Mok
(74) *Attorney, Agent, or Firm*—Laurence A. Greenberg; Werner H. Stemer; Ralph E. Locher

(57) ABSTRACT

An electromagnetic linear drive contains a stator and an armature. A relative movement between the stator and the armature can be effected. An air gap is formed between a surface of the armature and of the stator at least during a relative movement. The air gap is slanted with regard to the direction of the relative movement.

4 Claims, 3 Drawing Sheets

ELECTROMAGNETIC LINEAR DRIVE

BACKGROUND OF THE INVENTION

Field of the Invention

The invention relates to an electromagnetic linear drive having a stator and an armature which can be moved relative to the stator, with an air gap being formed between the stator and the armature at least during any relative movement between one surface of the armature and one surface of the stator.

An electromagnetic linear drive such as this is known, for example, from the German Laid-Open Specification DE 195 09 195 A1. In the known electromagnetic linear drive, an armature is guided within a coil. When current flows through the coil, the armature is moved by the magnetic forces that act. The armature has a pole plate which limits the movement of the armature. An air gap is formed between the pole plate and the stationary stator. The air gap is situated essentially at right angles to the movement direction of the armature.

The travel of such electromagnetic linear drives can be increased only to a limited extent. If the air gap is enlarged to a major extent, the magnetic flux can then be guided only to a limited extent, and the magnetic circuit has a high magnetic reluctance. This reduces the force acting on the armature of the electromagnetic linear drive. A compromise must therefore be found between long travel and the force acting on the armature, which decreases with increasing travel, for a design embodiment of an electromagnetic linear drive of the known type.

SUMMARY OF THE INVENTION

The invention is based on the object of designing an electromagnetic linear drive of the type mentioned in the introduction such that an adequate force acting on the armature can be produced even if the travel of the armature is increased.

According to the invention, the object is achieved for an electromagnetic linear drive of the type mentioned in the introduction in that the air gap is arranged at least partially obliquely with respect to the direction of the relative movement.

In order to produce a force which acts between the armature and the stator, the magnetic flux which originates from an electromagnet or permanent magnet must be passed through the air gap. In the case of a reluctance drive, a movement is produced by the magnetic flux always propagating along the path of the least magnetic reluctance. Compared with an air gap which is arranged at right angles to the movement direction of the armature, the inclined position of the air gap makes it possible to achieve a greater armature travel with the length of the effective size of the gap to be bridged by the magnetic flux being the same. Only those components of the magnetic flux which emerge from the armature or enter it parallel to its movement direction and bridge the air gap contribute to the production of a force effect. In addition, the surface areas of the armature and of the stator which are available for the entry and emergence of the electromagnetic flux are enlarged by the inclined arrangement of the air gap. It is also advantageously possible to provide for the surface of the armature and the surface of the stator to be aligned parallel to one another.

By way of example, surfaces which are aligned parallel may be plane-parallel surfaces or else three-dimensionally shaped surfaces. Surfaces which are aligned parallel and are three-dimensionally shaped are, for example, matching spherical sections or matching pyramids or cones. Surfaces such as these which are designed to match can be manufactured industrially quite easily and, in conjunction with the inclined air gap, increase the armature travel.

It is advantageously also possible to provide for the surfaces of the stator and of the armature to have surface elements whose surface normals differ from one another.

Surface elements such as these make it possible to enlarge the surface area of the stator and of the armature that is available for the magnetic flux to enter or emerge from, without having to increase the physical volume itself. By way of example, one particularly simple embodiment variant comprises an armature being in the form of a cuboid and that surface which faces the air gap being formed by two inclines, which run towards one another, at one end. In order to increase the effectiveness of the surface elements formed in this way, a matching contour should be formed on the corresponding surface of the stator. In addition to enlarging the surface areas for the guidance of the magnetic flux, this shape can also be used to fix the armature in a specific final position.

A further advantageous embodiment of the invention makes it possible to provide for different surface elements to have different gradients with respect to the direction of the relative movement of the stator and armature.

Splitting the surfaces of the stator and of the armature into a plurality of surface elements which themselves have different gradients makes it possible to better guide the magnetic flux within the stator and the armature, in particular on the surfaces on which the magnetic flux emerges from and enters the stator and the armature and is guided through the air gap. Different gradients make it possible to deliberately form individual zones in which it is possible to achieve a particularly high magnetic flux density. In one simple case, it is also possible to provide for two surface elements to be formed, by providing an armature (or a stator) with inclines which run to a point. The magnetic flux is split as uniformly as possible on the two inclined surface elements.

A further advantageous embodiment can provide for the surfaces to be stepped and for the steps to be bounded by interpolated envelope surfaces, which are arranged obliquely with respect to the direction of the relative movement.

From the production engineering point of view, steps can easily be produced on the surfaces. In this case, various step shapes may be provided for the steps. By way of example, these steps may be in the form of a sawtooth, a tilted sawtooth, rectangular steps or else curved steps. The stepped surfaces are in turn bounded by an interpolated envelope surface, that is to say further abstraction of the steps once again makes it possible to find an envelope surface which is aligned obliquely with respect to the direction of the relative movement.

In this case, it is also possible to provide for the steps to have first sections on which the surfaces of the stator and armature touch one another when the stator and the armature are in a first position with respect to one another.

The configuration of first sections, from which surfaces of the stator and armature touch in a first position, makes it possible to produce a self-retaining function of the electromagnetic linear drive. For example, it is possible in this way to provide for permanent magnets which produce a magnetic flux to be arranged on the electromagnetic linear drive. This magnetic flux path can then be closed via the touching surfaces of the stator and armature (the first sections), so that the stator and armature are held against one another. Regulation can be provided by variation of the size of the touching surface areas of the first sections independently of the holding force between the armature and the stator which is produced by the permanent magnets.

Furthermore, it is advantageously possible to provide for the steps to have second sections, on which an intermediate space is formed between the surfaces of the stator and the armature when the stator and the armature are in the first position with respect to one another.

The formation of intermediate spaces between the state and the armature makes it possible to deliberately create areas which have a high magnetic reluctance in sections of the surfaces between which an air gap is formed. This reluctance is higher, for example, than the magnetic reluctance of an iron core which is provided for steering and guidance of a magnetic flux. The intermediate spaces allow the magnetic flux to be deliberately guided into the first sections. In consequence, the holding force which, for example, originates from permanent magnets is used more effectively. The intermediate space prevent the occurrence of undesirable scatter of the magnetic flux. This is particularly necessary in order to force the magnetic flux to emerge from the surfaces as far as possible at right angles, since only the perpendicular components of the magnetic flux can produce desired force effects.

Furthermore, it is advantageously possible to provide for the first sections to be surfaces which are arranged essentially at right angles to the direction of the relative movement.

Perpendicular alignment of the first sections with respect to the direction of the relative movement of the stator and armature allows the linear drive to be produced with a compact form. It is thus possible to guide the lines of force in the area of the air gap as parallel as possible to the direction of the relative movement, and for them to be passed through the first sections in a specific manner. This is particularly advantageous when the first sections are arranged like steps with respect to one another and the first sections are connected via second sections of the steps which in turn form surfaces on which the direction vector of the relative movement lies. Steps such as these can in this case be designed three-dimensionally such that, for example, shapes are formed like stepped pyramids or a cylinder which tapers in a stepped manner. However, it is also possible to provide for the steps to be arranged only along one plane. In this case, the steps may in turn be bounded by interpolated envelope surfaces, which are arranged inclined with respect to the direction of the relative movement. The envelope surfaces can in this case in turn be formed from a plurality of envelope surface elements, which are arranged inclined with respect to one another, thus resulting, for example, in essentially v-shaped or w-shaped stepped surfaces on a section plane.

The invention will be described in more detail in the following text, and is illustrated schematically in a drawing, on the basis of one exemplary embodiment.

DESCRIPTION OF THE PREFERRED EMBODIMENTS

Figure 2:
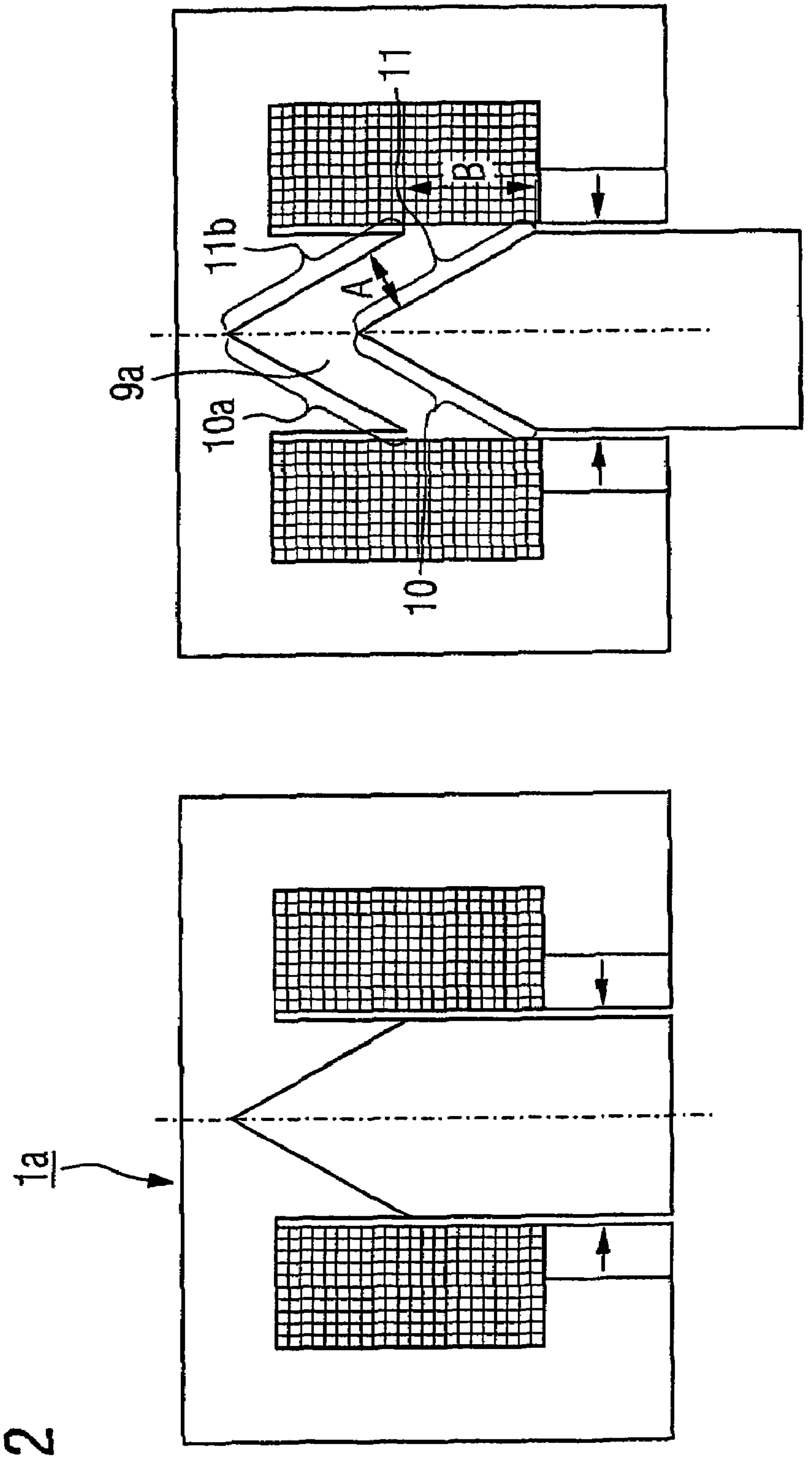
FIG. 2 shows a second embodiment variant of an electromagnetic linear drive.
Figure 3:
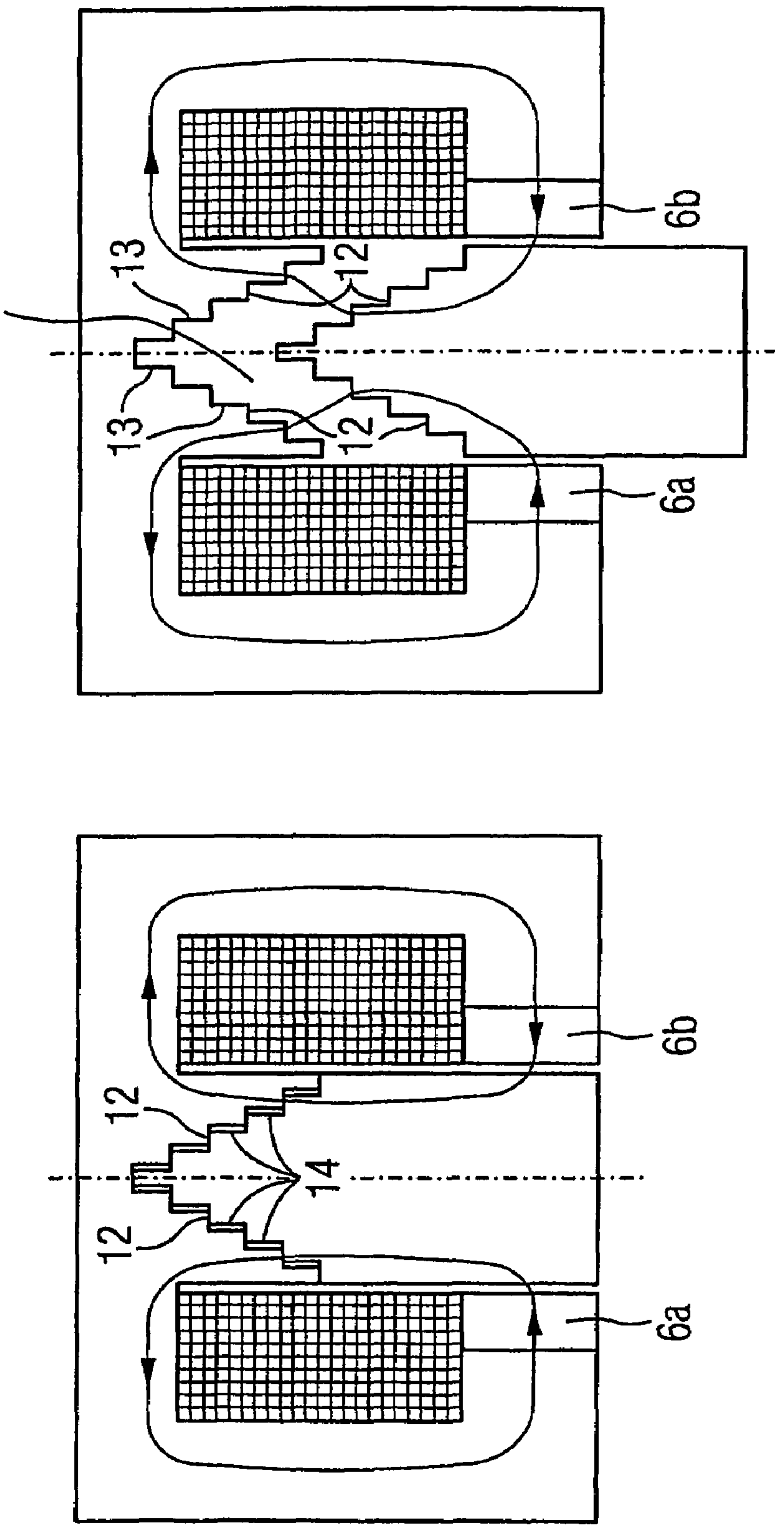
FIG. 3 shows a third embodiment variant of an electromagnetic linear drive.

The fundamental design of an electromagnetic linear drive will be explained first of all with reference to FIG. 1. The embodiment variants which are illustrated in FIGS. 2 and 3 correspond essentially to the design illustrated in FIG. 1. Differences can be seen in each case in the configuration of the air gap.

Figure 1:
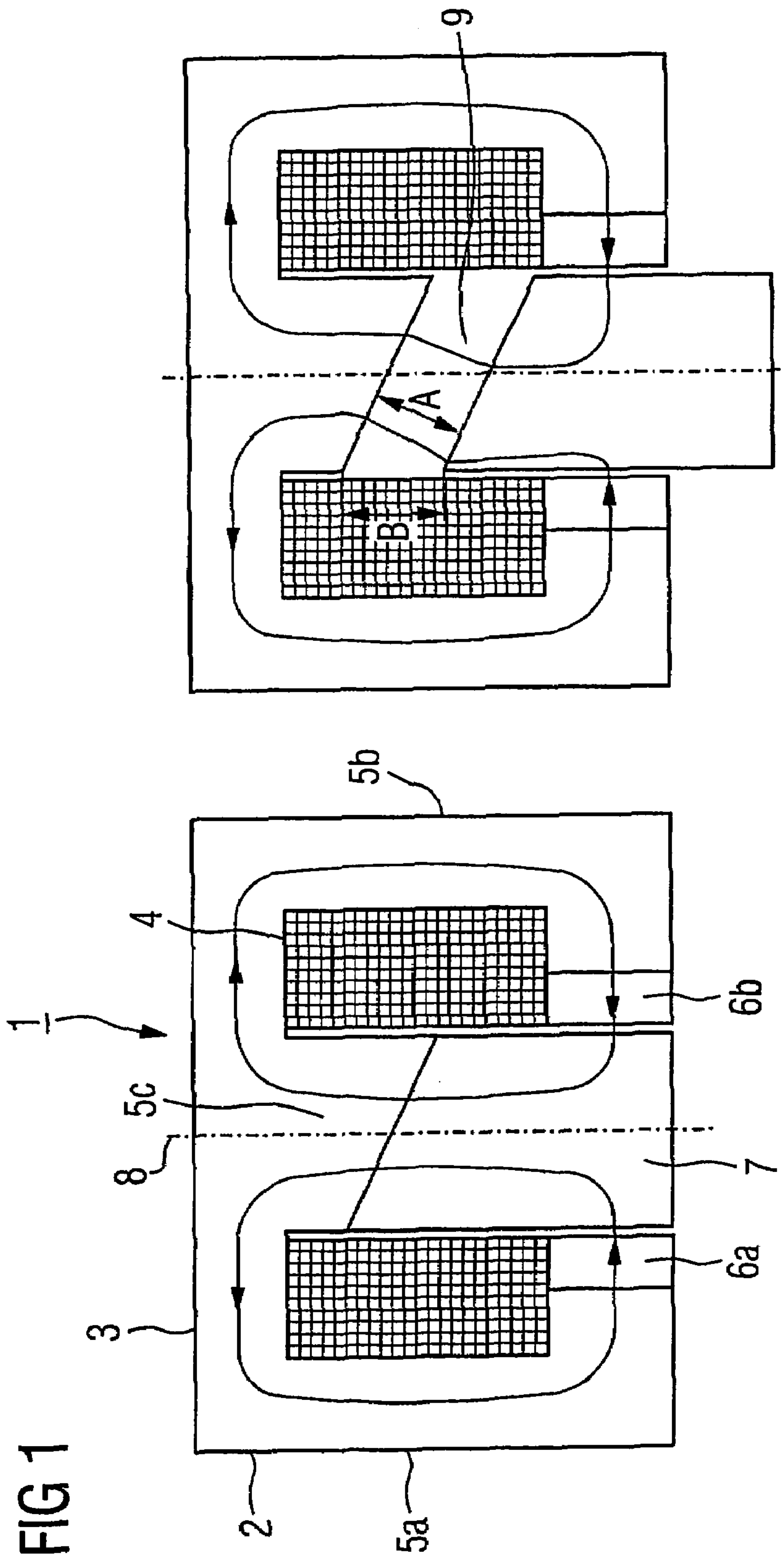
FIG. 1 shows a first embodiment variant of an electromagnetic linear drive.

FIG. 1 shows a first electromagnetic linear drive 1. The first electromagnetic linear drive 1 is in each case illustrated in a switched-on position and in a switched-off position. The first electromagnetic linear drive 1 has a stator 2. The stator 2 has a core 3 which is composed of a ferrite material. The stator 2 also has an electrical winding 4. An electric current can be applied to the electrical winding 4 such that a magnetic field surrounds the electrical winding 4. Major portions of this magnetic field are passed within the core 3 of the stator 2. The core 3 is in the form of a so-called three-limb core, with a first limb 5*a* and a second limb 5*b* surrounding the coil outside the winding 4. A third limb 5*c* partially penetrates into the interior of the electrical winding 4. This is not absolutely essential for operation of the electromagnetic linear drive 1. The first, the second and the third limbs 5*a*, 5*b*, 5*c* are connected to one another at a first end of the electrical winding 4. A pole shoe is in each case formed on the first and on the second limb 5*a*, 5*b* at the second end of the electrical winding 4. Permanent magnets 6*a*, 6*b* are arranged on the pole shoes. A recess is formed between the permanent magnets 6*a*, 6*b*. An armature 7 is mounted within this recess such that it can move. The armature 7 can move along its insertion direction. The insertion direction is shown by a dashed-dotted line 8 in the figures. The insertion direction corresponds to the direction of the relative movement between the stationary stator 2 and the movable armature 7. The third limb 5*c* which is associated with the stator 2 has a surface. Furthermore, the armature 7 has a surface. An air gap 9 is formed between the surfaces of the armature 7 and of the stator 2. The air gap 9 is arranged inclined with respect to the direction of the relative movement between the stator 2 and the armature 7. In the switched-on position, that is to say when the surfaces of the stator 2 and armature 7 which bound the air gap 9 are touching, the permanent magnets 6*a*, 6*b* produce holding forces. The magnetic flux which originates from the permanent magnets 6*a*, 6*b* passes through the electrical winding 4 and in each case forms closed lines of force via the first limb 5*a* and the third limb 5*c*, as well as via the second limb 5*b* and the third limb 5*c*. If an attempt is made to move the armature 7 away from the switched-on position (the first position of the stator 2 and armature 7 with respect to one another), the armature 7 is pulled back into the electrical winding 4 by the magnetic flux which originates from the permanent magnets 6*a*, 6*b*. Current must be passed through the electrical winding 4 in order to push the armature 7 back from the first position. First of all, the magnetic field must be formed for this purpose in order to overcome the magnetic field which is produced by the permanent magnets. As the current flow through the electrical winding 4 increases, the magnetic field which originates from the permanent magnets 6*a*, 6*b* is neutralized, and the armature 7 is finally pushed away from the first position. An air gap 9 is formed between the surfaces of the stator 2 and of the armature 7. In a second position, surfaces of the stator 2 and 7 which bound the air gap 9 do not touch. The profile of the magnetic flux which originates from the permanent magnets 6*a*, 6*b* is illustrated symbolically in FIG. 1. The lines of force which cause movement emerge at right angles from the surface of the stator 2 and of the armature 7. This means that the lines of force run obliquely with respect to the movement direction of the armature 7 in the area of the air gap 9. Because of the inclined position of the air gap 9, the distance A between the surfaces of the armature 7 and of the stator 2 which is effective for the magnetic lines of force is shorter than the travel B carried out by the armature 7. The distance A must be taken into account in order to produce a force effect on the armature 7. The force effect on the armature 7 also decreases with any increase in the distance A. The travel B with respect to the effective distance A is increased by the inclined position of the air gap 9.

An increased travel can be produced while maintaining the force effect, compared with an air gap which is arranged at right angles to the movement direction of an armature and in which the magnetically effective distance A is equal to the travel B. At the same time, the surface areas of the stator 2 and of the armature 7 which are available for the magnetic lines of force to enter and emerge from are enlarged by the inclined position of the air gap 9.

In order to produce a switching-on effect, that is to say a movement of the armature 7 into the interior of the electrical winding 4, current must flow appropriately through the electrical winding 4. This movement is assisted by the magnetic forces which originate from the permanent magnets 6*a*, 6*b*, provided that the polarity of the permanent magnets 6*a*, 6*b* is appropriate.

FIG. 2 shows an alternative embodiment of the air gap for a second electromagnetic linear drive 1*a*. The fundamental design and method of operation of the first electromagnetic linear drive 1 and of the second electromagnetic linear drive 1*a* are the same. The only difference is that the air gap 9*a* is in a modified form. Sets of components having the same effect are thus annotated with the same reference symbols. The process of switching the second electromagnetic linear drive 1*a* on and off corresponds to the above description. Only the form of the air gap 9*a* of the second electromagnetic linear drive 1*a* will therefore be described in the following text.

The air gap 9*a* of the second electromagnetic linear drive 1*a* has a first surface element 10 and a second surface element 11. The surface elements 10, 11 are arranged at an acute angle with respect to one another, and are arranged on the armature 7. Opposing surfaces 10*a*, 11*b*, which correspond to the surface elements 10, 11, are arranged on the stator 2. The surface normals both of the surface elements 10, 11 and of the opposing surfaces 10*a*, 11*b* each differ from one another. Only the mutually associated surface normals of the surface element 10 and of the associated opposing surface 10*a* as well as of the surface element 11 and the associated opposing surface 11*b* are the same. This means that the mutually associated surface elements are aligned parallel to one another. An embodiment of the air gap 9*a* such as this also results in an increase in the travel B in comparison to the magnetically effective distance A. The acute-angled alignment of the surface elements with respect to one another results in the armature 7 being centered with respect to the stator 2 when the stator 2 and armature 7 assume a first position with respect to one another.

A further embodiment of a third electromagnetic linear drive 1*c* is illustrated in FIG. 3. In the third electromagnetic linear drive 1*c*, the air gap 9*b* is formed by stepped surfaces. The steps have first sections 12 which are arranged essentially at right angles to the movement direction of the relative movement of the stator 2 and armature 7. The first sections 12 are connected to one another via second sections 13. When the stator 2 and armature 7 are in a first position with respect to one another (the switched-on position), the first sections 12 touch. When the stator 2 and armature 7 are in the first position with respect to one another, an intermediate space 14 is formed between second sections 13 of the steps. The intermediate spaces 14 are filled, for example, with air. The intermediate spaces 14 represent a section of increased magnetic reluctance. In consequence, the magnetic fluxes which originate from the permanent magnets 6*a*, 6*b* (as well as those which originate from an electrical winding 4 through which a current is flowing) pass through the touching surface in the first sections 12. Since the first sections 12 are located at right angles to the direction of the relative movement between the armature 7 and the stator 2, the magnetic flux can pass through the first sections 12 virtually at right angles and free of unnecessary deflections. Since the forces are in each case produced only by those components of the magnetic flux which act at right angles to the surface from which the magnetic flux emerges, this makes it possible to produce virtually the maximum force effect between the stator 2 and the armature 7. The magnetic flux which originates from the electrical winding 4 when current flows through is aligned parallel/parallel in the opposite direction to the fluxes illustrated in the figures.

I claim:

1. An electromagnetic linear drive, comprising:

a stator having a surface; and an armature having a surface and being moved relative to said stator, said stator and said armature defining an air gap there-between at least during any relative movement between said surface of said armature and said surface of said stator, said air gap being disposed at least partially obliquely with respect to a direction of the relative movement;

said surface of said armature and said surface of said stator being stepped surfaces having steps, said steps being bounded by interpolated envelope surfaces that are disposed obliquely with respect to the direction of the relative movement;

said steps having first sections on which said surfaces of said stator and said armature touch one another when said stator and said armature are in a given position with respect to one another;

said steps having second sections, on which an intermediate space is formed between said surfaces of said stator and said armature when said stator and said armature are in the given position with respect to one another; and said first sections being surfaces that are disposed substantially at right angles to the direction of the relative movement.

2. The electromagnetic linear drive according to claim 1, wherein said surface of said armature and said surface of said stator are aligned parallel to one another.

3. The electromagnetic linear drive according to claim 1, wherein said surface of said stator and said surface of said armature each have surface elements with surface normals that differ from one another.

4. The electromagnetic linear drive according to claim 3, wherein said surface elements have different gradients with respect to the direction of the relative movement of said stator and said armature.

* * * * *